Sept. 23, 1969  W. A. WALL, JR  3,469,068
WELDING SKATE WITH COMPUTERIZED CONTROL
Filed Oct. 2, 1967  5 Sheets-Sheet 1

INVENTOR.(S)
WILLIAM A. WALL JR.
BY
ATTORNEYS

Sept. 23, 1969 W. A. WALL, JR 3,469,068
WELDING SKATE WITH COMPUTERIZED CONTROL
Filed Oct. 2, 1967 5 Sheets-Sheet 2

INVENTOR(S)
WILLIAM A. WALL, JR.
BY
ATTORNEYS

Sept. 23, 1969    W. A. WALL, JR    3,469,068
WELDING SKATE WITH COMPUTERIZED CONTROL
Filed Oct. 2, 1967    5 Sheets-Sheet 3

INVENTOR.(S)
WILLIAM A. WALL JR.
BY
ATTORNEYS

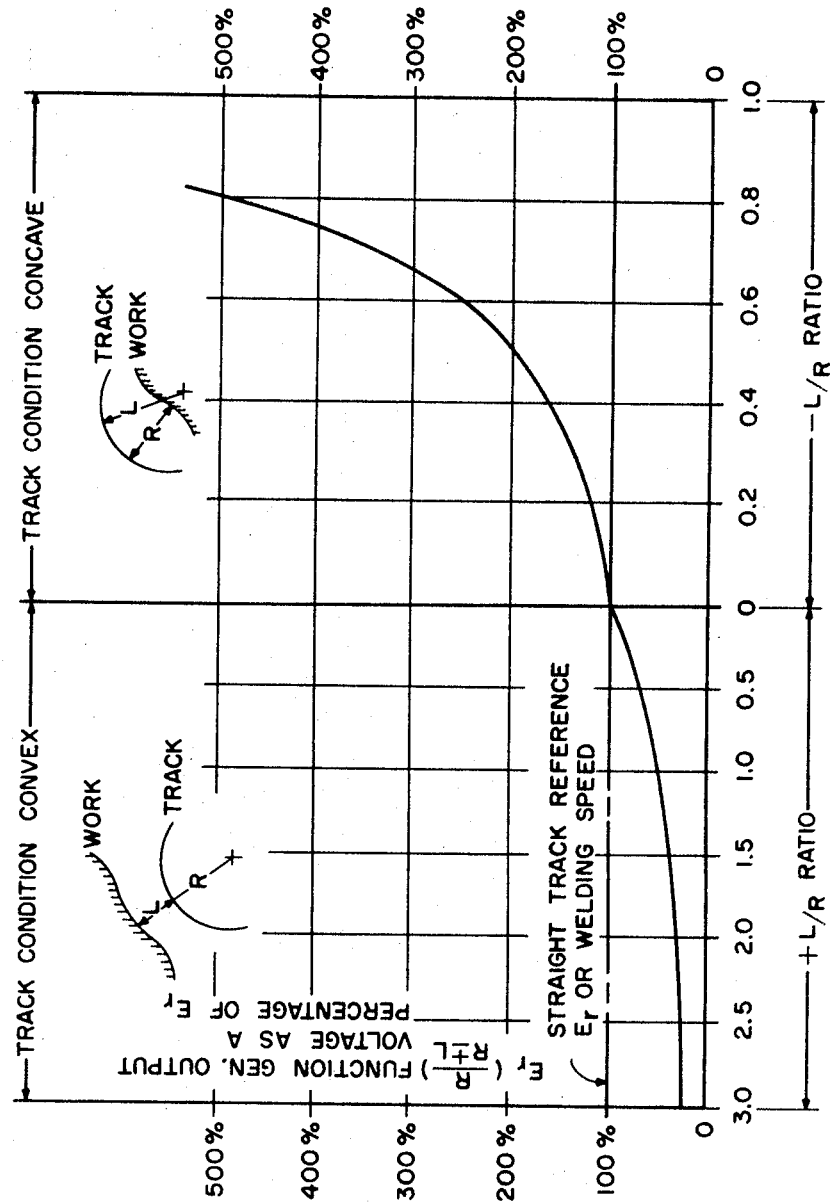

United States Patent Office

3,469,068
Patented Sept. 23, 1969

3,469,068
WELDING SKATE WITH COMPUTERIZED CONTROL
William A. Wall, Jr., Huntsville, Ala., assignor to the United States of America as represented by the Administrator of the National Aeronautics and Space Administration
Filed Oct. 2, 1967, Ser. No. 672,382
Int. Cl. B23k 9/12
U.S. Cl. 219—125                                10 Claims

ABSTRACT OF THE DISCLOSURE

An apparatus for automatically varying a skate or carriage speed to obtain a substantially constant traversal speed of the welding torch or the like along the work surface. Control is accomplished through utilization of an analog computer which combines electrical inputs, representing various parameters of a carriage type system, and computes the instantaneous skate or carriage velocity for a constant welding speed.

Background of the invention

The invention described herein was made by an employee of the United States Government and may be manufactured and used by or for the Government for governmental purposes without the payment of any royalties thereon or therefor.

This invention relates to apparatus for automatically tracking a seam in a work and more particularly to apparatus for maintaining a welding torch or the like at a constant traversal speed along an undulating work surface.

In the art of automatic welding operations, substantial problems exist in maintaining a welding tip at a proper attitude to a wavy work surface and in moving the welding tip at a constant speed along the wavy work surface. U.S. patent application S.N. 658,956, filed Aug. 7, 1967, by W. A. Wall, Jr. and V. H. Yost discloses an analog computer technique to control the instantaneous torch angle between a track on which a welding carriage is traveling and a tangent to the work surface. The control technique, however, is partially limited to straight or a constant radius track in which the weld velocity is the resultant of the instantaneous carriage velocity and the actuator arm velocity. In a wavy track situation it is apparent that the carriage velocity relative to the work surface would also vary since the carriage will occasionally be coming toward the work surface and also occasionally be moving away from the work surface. Herebefore no satisfactory solution to the additional problems encountered by the use of a wavy track has been found.

Accordingly, it is an object of the present invention to provide an automatic control for a carriage or skate such that it will maintain a substantially constant torch tip velocity even when the track and/or work surface is wavy.

This and other objects, uses, and advantages of the present invention will become apparent as the description proceeds.

Brief summary of the invention

In accordance with the present invention, an analog computer and associated apparatus is utilized to electrically compensate for working environments involving the use of a carriage traveling a wavy track while its proximity actuator arm adjusts to a wavy working surface. The analog computer utilizes electrical signals regarding the radius of curvature of the welding skate track, regarding the distance from the skate track to the work surface, and regarding the angle $\phi$ formed by the intersection of a tangent to the welding skate and a tangent to the work surface and derives the necessary correction signals to the carriage motor.

This will be more readily understood by the following detailed description when taken together with the accompanying drawings.

Brief description of the drawings

FIGURE 7 is a graphical illustration of the input-output characteristics of the function generators.

Detailed description of the presently preferred embodiment

Figure 1:
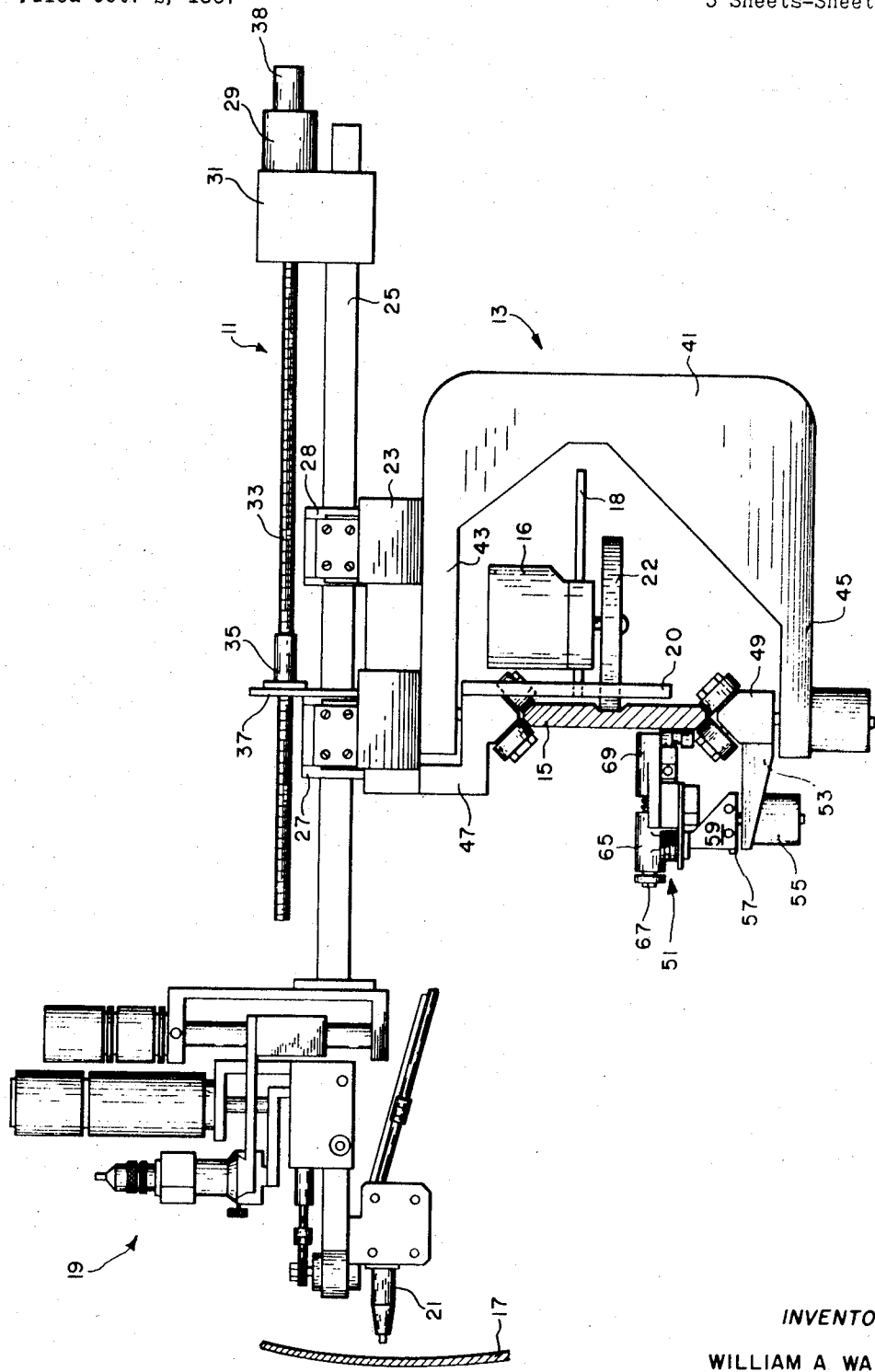
FIGURE 1 is a side view of a welding apparatus utilizing the present invention.

Referring now to FIGURE 1 wherein is illustrated a welding apparatus having a conventional actuator arm 11 mounted on a carriage or skate 13. The carriage 13 is adapted to move along a track 15 adjacent the work surface 17 while keeping the actuator arm 11 approximately perpendicular to the track 15 at all times.

The actuator arm 11 has a torch manipulator 19 on its forward end for maintaining a torch 21 at a desired angle to the work surface 17 in response to electrical control means (not shown). The manipulator 19 and its electrical control means is disclosed and discussed in U.S. patent application S.N. 658,956, filed Aug. 7, 1967.

The actuator arm 11 has a supporting base 23 which is secured to the carriage or skate 13. The arm 11 includes a slide bar 25 adapted to move back and forth through linear bearing assemblies 27 and 28 attached to the base 23. The rear end of the slide bar 25 supports a servo motor 29 and gearing assembly 31. The servo motor 29 and gearing assembly 31 drive an elongated screw 33 which acts through a nut assembly 35 fixed to an upstanding support 37. The support 37 is secured to the base 23 adjacent the forward linear bearing assembly 27 and its center portion is removed so as not to interfere with the action of the slide bar 25.

It is apparent that as the servo motor 31 drives the elongated screw 33 clockwise or counterclockwise it will, by acting through the fixed nut assembly 35, cause the slide bar 25 to move either forward or backward in relationship to the base 23. The servo motor 29 is controlled by a conventional electrical system (not shown) for maintaining constant arc length by comparing the arc voltage with a reference and feeding the difference into a servo amplifier. The gearing assembly 31 also drives the wiper of what is designated a L potentiometer 38 engaged therewith for supplying the electrical analog of what constitutes the distance between the track 15 and the work surface 17 along the actuator arm 11. The purpose of setting the L potentiometer 38 to give an electrical analog signal of the varying distance between the track and the work surface 17 along the actuator arm, as the carriage 13 moves along the track 15 will be discussed more fully further on in the description.

The skate or carriage 13 is defined by a vertical main body 41 having an upper 43 and lower 45 forwardly extending arm portions. The base 23 of the actuator arm 11 is supported on the top side of the upper arm portion 43. An upper wheel truck 47 is pivotally connected to the bottom side of the upper arm 43 and a lower wheel truck 49 is pivotally joined to the top side of the lower arm 45. The wheel trucks 47 and 49 support the carriage 13 upon a track 15 which runs along adjacent the length of the surface 17 to be worked on. A more detailed explanation of the operation of the wheel trucks appears in U.S. Patent No. 3,229,883 which issued on Jan. 18, 1966, to the inventor, V. H. Yost.

A carriage motor and gearing assembly 16 is located in an area between the upper 43 and lower 45 arm portions of the carriage 13. The motor and gearing assembly 16 is supported by a pair of shafts 18 which are parallel to one another and extend horizontal from a plate support 20. The plate support 20 is connected at its upper end to the upper wheel truck 47. The shaft of the motor and gearing assembly 16 rotates a carriage drive wheel 22 having a rubber tread or the like fixed to its perimeter so as to be in frictional contact with a groove which extends along the length of the track 15. The wheel 22 extends through a slot within the plate support 20.

The track curvature radius R is determined by the electromechanical assembly 51 supported on a cantilevered member 53 extending from the lower wheel truck 43, beneath the track 15, as shown in FIGURE 1. The assembly 51 is pivotally connected to the cantilevered member 53 by a bearing assembly 55 and shaft 57.

Figure 2:
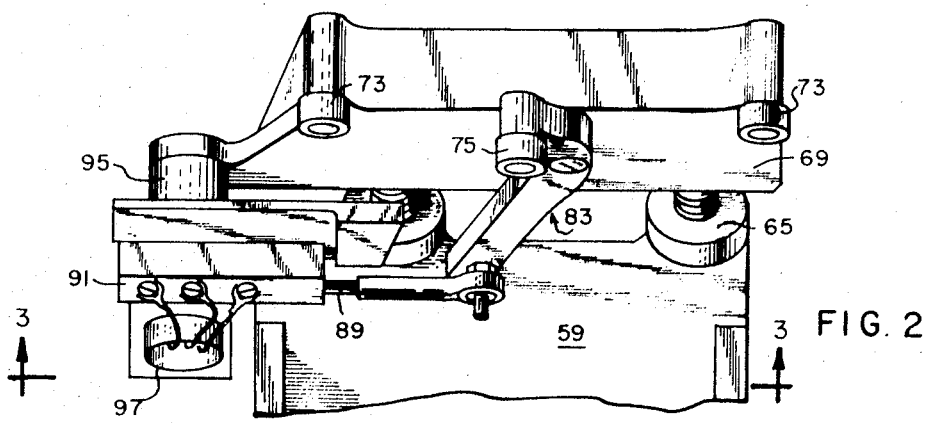
FIGURE 2 is a partial perspective view of the assembly which senses the radius of the track curvature, with parts removed for clarity.
Figure 3:
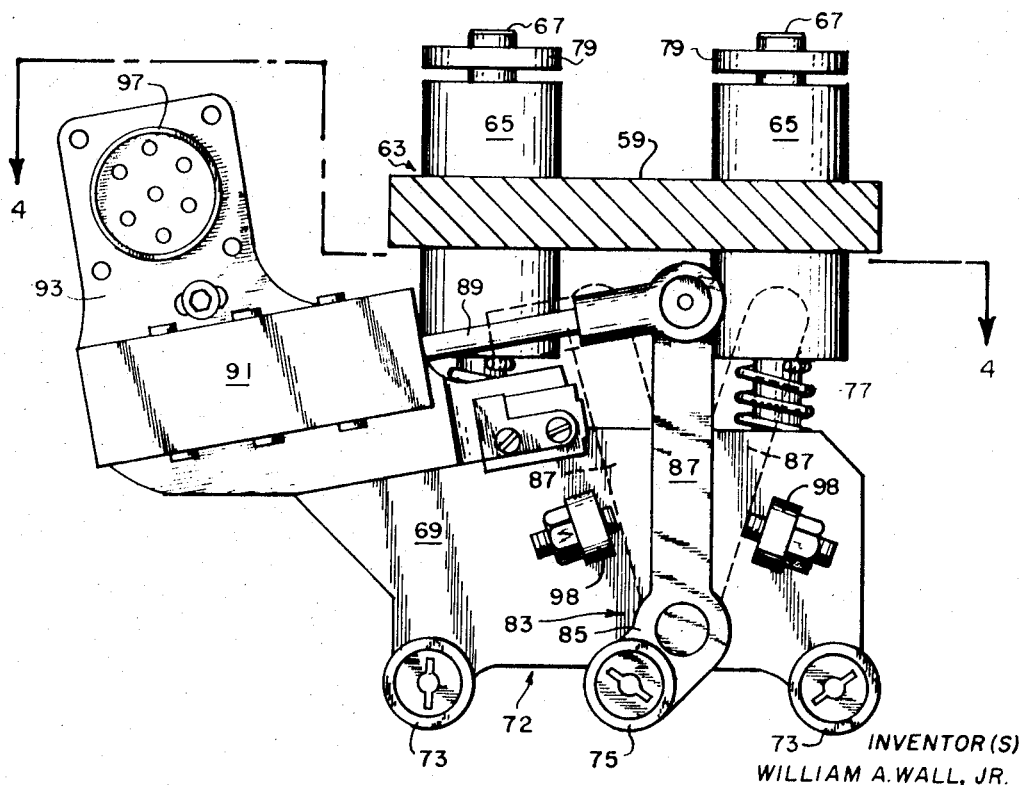
FIGURE 3 is a cross-sectional view of the assembly taken along the line 3—3 of FIGURE 2.
Figure 4:
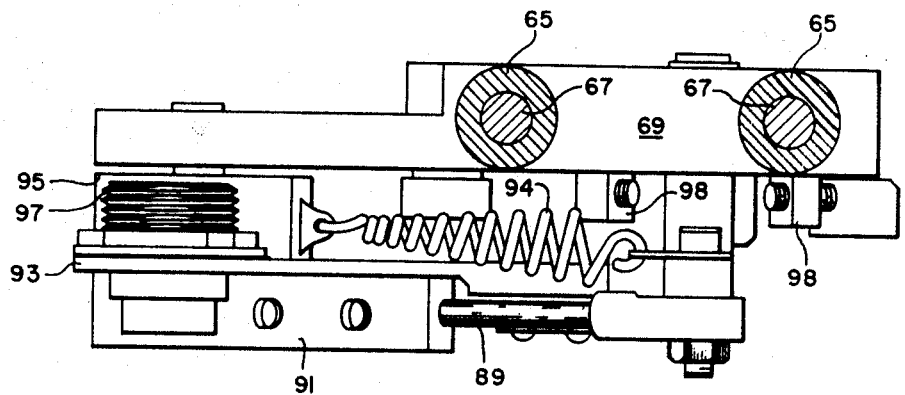
FIGURE 4 is a cross-sectional view taken along line 4—4 of FIGURE 3.

The electromechanical assembly 51 is shown in greater detail in FIGURES 2, 3, and 4. It has a vertical body portion 59 which is secured to the shaft 57 of the bearing assembly 55. At the top of the vertical body portion 59 and secured in grooves in the upper side (see FIG. 3) are two horizontal aligned cylinders 65. Through each cylinder 65 extends a shaft 67, and each shaft 67 is fixed at its forward end to the same plate block 69. As shown best in FIGURE 3, the forward edge 72 of the block 69 has two further extensions adjacent each side to each of which a roller cam 73 is pivoted for rotative movement. The roller cams 73 are adapted to be pressed against the side of the track 15 by the action of the coil springs 77 which encircle each shaft 67 and extend between the ends of the cylinders 65 and the block plate 69. Each of the shafts 67 has a washer like member 79 secured adjacent its rear end to prevent the shafts 67 from sliding completely through the cylinders 65.

A center roller cam or wheel 75 is pivotally connected to a lever 83 so as to extend between the two side roller cams or wheels 73. The lever 83 has a short forward portion 85 which is at a slight angle to the longer portion 87. The lever 83 is pivotally joined to the bottom of the plate 69 at the junction of its forward and rear portions 87 and 85. The end of the rear portion 87 is attached to a wiper shaft 89 of a slide potentiometer 91 which is designated as the R potentiometer because it provides the electrical analog of the radius of a curve which is in the track 15. The R potentiometer 91 is fixed to a support plate 93, see FIGURE 4, which is secured to a pedestal or filler member 95. The pedestal 95 is pivotally connected to the bottom side of the block plate 69 so as to allow the slide potentiometer 91 to pivot slightly and prevent any binding of the lever's movements. A male electrical connector 97 is fixed to the support plate 93 adjacent the potentiometer 91 to electrically connect the R potentiometer 91 with the control circuit which will be discussed in reference to FIG. 6. An extension spring 94 extends from a stud 96, at the pivot point between the wiper 89 and lever portion 87, to the pedestal 95. The spring 94 serves as a return means for the lever 83. Stops 98 extend from the bottom of the block 69 and are oriented on either of the lever 83 to prevent displacement beyond these points.

The cam rollers 73 and 75 touch the track 15 so as to define three points of any curve therein and thus are able to define an indefinite number of circles, as the carriage 13 moves along a track 15, by the action of the center roller cam 73.

The assembly 51 is calibrated by aligning all the centers of the roller cams 73 and 75, which have the same diameter, in a straight line when the electrical position of the wiper shaft 89 in the potentiometer 91 is at the center of the potentiometer resistance element. Thus, the potentiometer 91 is electrically connected so that all concave curves position the wiper shaft on one side of the electrical center and all convex curves position it on the opposite side of the electrical center. The potentiometer 91 is further arranged in a conventional bridge circuit discussed in reference to FIG. 6 to yield a positive signal for a concave curve and a negative signal for a convex curve. Thus, movement of the lever arm 83 in response to curves in the track 15 will vary the resistance of the potentiometer 91 to give an accurate electrical analog of the radius of the curves.

Figure 5:
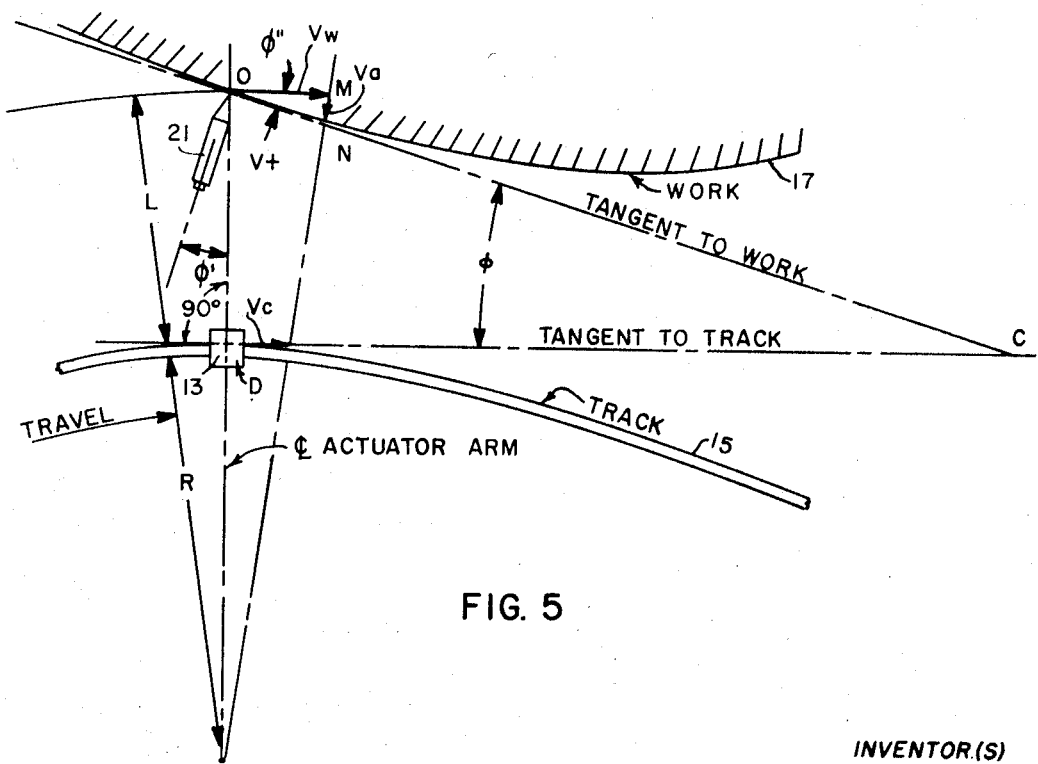
FIGURE 5 is a schematic illustrating the principle of operation of the apparatus of FIGURE 1.

The purpose of having the additional electrical analog inputs provided by the L potentiometer 38 and the R potentiometer 91 will be understood by reference to the schematic of FIGURE 5. The letter L represents an instantaneous distance from the track 15 to the work surface 17 and the letter R represents an instantaneous radius of curvature of the track 15. Assuming that the carriage 13 is traveling on a curved track 15 and the torch 21 is arc welding a curved work surface 17, it can be seen that the torch 21 will have an actuator arm velocity vector $V_a$ or MN away from the work surface as well as a carriage velocity vector $V_c$ parallel to a tangent to the track 15.

Further, it should be noted that the angular velocity $V_w$ or OM is imparted to the welding torch tip 21. It is evident by inspection of triangle OMN that an angular velocity $V_w$ or OM is proportional to the weld carriage velocity $V_c$ because of the similar triangle relationship by the factor:

$$R \pm L/R$$

The sign of L depends on whether it is measured from the convex (negative L) or concave (positive L) side of the track.

Also, it should be noted that the welding tip velocity $V_t$ forms the hypotenuse of right triangle OMN and an angle $\phi$ is included by the torch tip velocity vector $V_t$ or ON, and the angular velocity vector $V_w$ or OM. Angle $\phi''$ is equal to angle $\phi$ which is included between a tangent to the track 15 at the carriage 13 location and a tangent to the work surface 17 at the welding arc location. Both of these angles are equal to angle $\phi'$ included by lines perpendicular to the aforementioned tangents, which is designated as the torch angle.

In general, welding criteria dictate that the electrode holder tip velocity $V_t$ be held constant. Since the velocity $V_a$ is varying due to the movement of the actuator arm, it is necessary to select the carriage velocity vector $V_c$ as the variable to maintain the velocity vector $V_t$ constant. From FIGURE 5, it can be seen that torch tip velocity $V_t$ is equal to the angular velocity vector $V_w$ multiplied by the secant of $\phi''$. Thus: $V_t = V_w \sec \phi''$ Since it has already been shown that $$V_w = V_c \left( \frac{R \pm L}{R} \right)$$

by substitution we may express the welding tip velocity $V_t$ as (1)  $$V_t = V_c \left( \frac{R \pm L}{R} \right) \sec \phi''$$

The factors $(R \pm L)/R$ and secant $\phi''$ are undesirable in attempting to keep the welding velocity $V_t$ constant. To electrically counteract these undesirable features, a substitution may be made. A voltage, $KE_c$, may be substituted which is proportional to the skate velocity $V_c$. Secant $\phi''$ is equal to $1/\cos \phi''$ by definition.

Substituting $KE_c = V_c$ and $$\sec \phi'' = \frac{1}{\cos \phi''}$$

into Equation 1 above results in the following equation:

(2) $\quad V_t = KE_c \left[ \dfrac{R \pm L}{R} \right] \dfrac{1}{\cos \phi''}$

Electrically, the factors $R/(R \pm L)$ and $\cos \phi''$ can be computed and electrically connected to cancel the mechanically generated welding velocity error factors $(R \pm L)/R$ and $1/\cos \phi''$. Thus for the convex curve case as seen in FIGURE 5 where the electrically computed factors in parenthesis are inserted into torch speed Equation 2 above results in the following equation:

(3) $\quad V_t = KE_c \left[ \dfrac{R+L}{R} \right] \left( \dfrac{R}{R+L} \right) \dfrac{1}{\cos \phi''} (\cos \phi'')$ Cancelling terms:

$$V_t = KE_c$$

therefore, the torch velocity becomes proportional to the desired carriage speed signal $E_c$.

It is now evident that in the convex curve case that by multiplying voltage $KE_c$ by the factors $R/R+L$ and $\cos \phi''$ can be a method to cancel the undesirable factors.

Similarly it can be shown in the concave curve situation that by multiplying voltage $KE_c$ by the factors $R/(R-L)$ and $\cos \phi''$ can be utilized to cancel the undesirable factors. Of course in this instance there is a practical limit because as L approaches R, the speed correction factor $R/(R-L)$ approaches infinity. A design criteria is thus proposed that L should never exceed 80% of R for the concave curve condition.

For any combination of L and R there will be a finite value of each function $R/(R+L)$ and $R/(R-L)$. For instance, the solution of $R/(R-L)$ is 2 whether $R=2$ and $L=1$ or whether $R=10$ and $L=5$. Similarly the ratio $L/R$ always reduces to 1/2 when solved for the same combination of values for R and L. Thus, for any value of $L/R$ there is a finite value of $R/(R \pm L)$.

It is thus proposed by the present invention to electrically compute the instantaneous ratio of $L/R$ and use the resultant ratio to pick off the proper operating point from curve $R/(R+L)$, where the torch is on the convex side of the curved track, or curve $R/(R-L)$, where the torch is on the concave side of the curved track. Since the R potentiometer 91 is arranged in a bridge circuit, which will be discussed in regard to FIG. 6, to derive a negative signal for a concave track curve and a positive signal for a convex track curve, a positive ratio of $L/R$ will indicate a convex track curve and a negative ratio of $L/R$ will indicate a concave track curve.

The equivalent electrical analog values from velocity vectors $V_c$, $V_w$, instantaneous distance L and instantaneous radius of curvature $\pm R$ are easily obtained from the apparatus described. The instantaneous solution of the angle $\phi''$ is derived from a torch angle computer such as described in U.S. patent application S.N. 658,956 filed Aug. 7, 1967.

Figure 6:
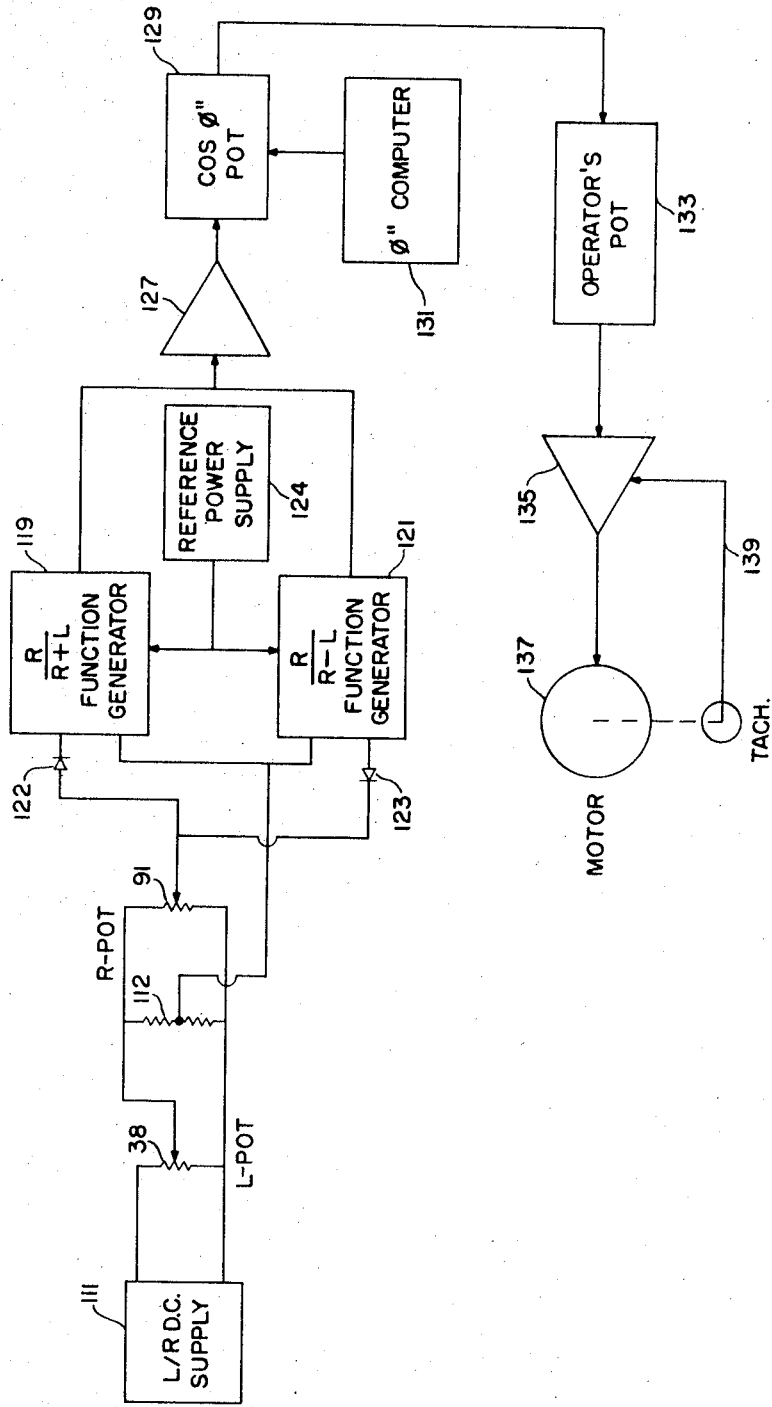
FIGURE 6 is a block diagram of the electrical circuitry used to operate the apparatus of FIGURE 1.

An electrical computer circuit to achieve the necessary velocity compensation of the carriage 13 is shown in partial block diagram form in FIGURE 6. A regulated direct current supply 111 feeds the L potentiometer 38 which was discussed in reference to FIGURE 1. The L potentiometer 38 is calibrated to yield a voltage equivalent of instantaneous distance L (see FIG. 5). This electrical analog of the distance L is then applied to the R potentiometer 91 which is arranged in a bridge circuit with a center tap resistance 112 so as to derive a voltage, $\pm E_{L/R}$, which is analogous to the ratio $L/R$. A negative ratio, $-E_{L/R}$, indicating a concave track curve and a positive ratio, $+E_{L/R}$, indicating a convex track curve.

Since for any value of $L/R$ there is a finite value of $R/(R \pm L)$, the voltage $\pm E_{R/L}$ is utilized to drive two function generators 119 and 121 which varies a reference power supply 125, which has a voltage output $E_r$, by the values of the function $R/(R \pm L)$. The reference power supply voltage $E_r$ corresponds to the output electrical analog for a straight track and/or when L is equal to zero. The polarity of voltage $E_{L/R}$ being plus or minus based on the shape of the skate track, i.e. convex or concave, diodes 122 and 123 route the $\pm E_{L/R}$ signal automatically to the correct function generator 119 or 121.

FIGURE 7 illustrates a typical input-output characteristic of the function generators 119 and 121. Note that the 100% reference line represents the output voltage equivalent of a straight track and/or when $L=0$. It is easily discerned from the percentage correction curves that rotational errors are potentially very large and would usually have considerable effect on welding.

Referring back to FIGURE 6, a power amplifier 127 follows the function generators 119 and 121 to prevent their loading. Voltage $E_r[R/(R \pm L)]$ is next multiplied by the cosine $\phi''$ potentiometer 129 whose wiper shaft is regulated by an angle $\phi''$ computer 131 such as disclosed in U.S. patent application S.N. 658,976 filed Aug. 7, 1967. The angle $\phi''$ being the same angle $\phi''$ shown and discussed in reference to FIGURE 5. The cosine $\phi''$ potentiometer 129 is used to correct for any angle $\phi''$ velocity error.

The corrected reference voltage $E_r[R/(R \pm L)] \cos \phi''$ is applied to the operator's carriage speed potentiometer 133 which should be calibrated in inches per minute welding speed so the necessary speed changes will be made automatically. The output of potentiometer 133 is then applied to the carriage amplifier 135 and motor system 137 which has a linear input voltage vs. motor speed characteristic. The tachometer feedback arrangement 139 assures close adherence of carriage velocity $V_c$ to its control signal.

It is believed apparent that an improved apparatus for welding, cutting, tracking, and the like has been disclosed which has numerous advantages because of the independence of the control inputs from the condition of the work surface.

Obviously, many modifications and variations of the present invention are possible in light of the above teachings. It is, therefore, to be understood that within the scope of the appended claims the invention may be practiced other than as specifically described.

What is claimed is:

1. In an apparatus of the type including a motor driven carriage traveling a track near a work surface, the carriage supporting an actuator arm perpendicular to the instantaneous longitudinal direction of the track at the carriage location, and the actuator arm being automatically adjustable to maintain a substantially constant distance between its end and the work surface, the improvement comprising:

means for producing a first electrical analog of the instantaneous distance between the track and the work surface along the centerline of the actuator arm;

means for producing a second electrical analog of the instantaneous radius of the track at the carriage location, a positive analog for a convex track curve and a negative analog for a concave track curve;

means for producing a third electrical analog corresponding to the desired speed of the carriage along a straight track;

computer means using the inputs of said first and second electrical analogs to vary the reference third electrical analog by the factor $$R/R \pm L$$

where:
R = instantaneous radius of the track at the carriage location;
L = instantaneous length from the track to the work surface, along the centerline of the actuator arm, a positive length for a convex track curve and a negative length for a concave track curve so as to produce a first modification of the reference voltage suitable for canceling the mechanical error factors introduced by a curved track and curved working surface.

2. An apparatus as defined in claim 1 including:
a torch on said actuator arm and means for maintaining said torch approximately at a variable angle $\phi'$ to the centerline of the actuator arm,
means for changing said first modification of the reference electrical analog by multiplying its value by the cosine of the angle $\phi'$ so as to obtain a third modification of the reference electrical analog; and
means for driving the motor of said carriage at a speed corresponding to the value of said third modification of the reference electrical analog.

3. An apparatus as defined by claim 1 wherein said means for producing a first electrical analog includes:
two spaced side cams adapted to define an imaginary line therebetween;
a support plate adapted to press said side cams in contact with the side surface of the track;
a center cam substantially midway between said side cams;
means attached to said support plate for supporting said center cam for movement transverse to the imaginary line between said side cams whereby said center cam is adapted to touch the side surface of the track;
means giving an electrical analog proportional to the movement of said center cam transverse to the imaginary line which corresponds to the approximate radius of a circle define by the three contact points between said cams and the side surface of the track.

4. An apparatus as defined by claim 3 including means for pivotally supporting said support plate on the carriage.

5. An appartus as defined by claim 4 wherein said means for pivotally supporting said support plate, includes a means for spring biasing said plate so said side cams will continually touch the side surface of the track through different curves therein.

6. An apparatus as defined by claim 3 wherein said means for giving an electrical analog is a potentiometer having a wiper shaft controlled by the movements of said center cam.

7. In an apparatus of the type including a motor driven carriage traveling a track near a work surface, the carriage supporting an actuator arm perpendicular to the instantaneous longitudinal direction of the track, the actuator arm being automatically adjustable to maintain a substantially constant distance between its end and the work surface, a torch on said actuator arm adjacent the work surface, and means for maintaining said torch approximately at a variable angle $\phi'$ to the centerline of the actuator arm, the improvement comprising:
means for producing a control signal to said carriage motor corresponding to a desired straight track speed of said carriage; and
means for varying said control signal by the following factor:

$$\left(\frac{R}{R\pm L}\right) \text{cosine } \phi'$$

where:
R=instantaneous radius of the track at the carriage location,
L=instantaneous length from the track to the work surface along the centerline of the actuator arm, a positive L for a convex track curve, and a negative L for a concave track curve,
$\phi'$=instantaneous torch angle.

8. An apparatus as defined by claim 7 wherein said means for varying said control signal comprises:

means for producing a first electrical analog of the instantaneous distance between the track and work surface along the centerline of the actautor arm;
means for producing a second electrical analog of the instantaneous radius of the track at the carriage location, a positive electrical analog for a convex curve and a negative electrical analog for a concave curve;
means for producing a third electrical analog corresponding to a ratio of said first electrical analog to said second electrical analog;
means using the input of said third electrical analog for varying said control signal by the factor $$R/R\pm L$$

where:
R=instantaneous radius of the track at the carriage location,
L=instantaneous length from the track to the work surface along, approximately, the centerline of the actuator arm, a positive L for a convex track curve, and a negative L for a concave track curve.

9. An apparatus as defined by claim 8 wherein said means for varying said control signal further includes:
a cosine potentiometer for varying said control signal by the cosine of the angle of rotation $\phi'$ of its wiper shaft;
a computer means for rotating said wiper shaft to an angle corresponding to the instantaneous touch angle.

10. An apparatus as defined by claim 8 wherein said means using the input of said third analog, comprises:
a first function generator using the input of said third electrical analog which is a positive value for varying said control signal by the factor:

$$R/R+L$$

where:
R=instantaneous radius of the track at the carriage location;
L=instantaneous length from the convex track to the work surface along, approximately, the centerline of the actuator arm;
a second function generator using the input of said third electrical analog which is a negative value for varying said control signal by the factor $$R/R-L$$

where:
R=instantaneous radius of the track at the carriage location;
L=instantaneous length from the concave track to the work surface along, approximately, the centerline of the actuator arm;
and means for routing said third electrical analog which is positive to the first function generator and which is negative to the second function generator.

References Cited

UNITED STATES PATENTS

| | | | |
|---|---|---|---|
| 2,175,496 | 10/1939 | Troyer | 33—174 |
| 2,344,216 | 3/1944 | Raydon | 33—174 |
| 2,881,295 | 4/1959 | Brown | 338—120 |
| 3,216,641 | 11/1965 | Brems. | |
| 3,268,805 | 8/1966 | Normando | 219—125 X |
| 3,315,367 | 4/1967 | Walsh et al. | 33—178 |
| 3,373,914 | 3/1968 | Wall | 219—125 X |

JOSEPH V. TRUHE, Primary Examiner

L. A. SCHUTZMAN, Assistant Examiner

U.S. Cl. X.R.

228—8